United States Patent [19]

Brimberg

[11] Patent Number: 4,652,239
[45] Date of Patent: Mar. 24, 1987

[54] SPACE PLANNING SYSTEM AND METHOD

[76] Inventor: Barnett J. Brimberg, 427 Exposition Blvd., New Orleans, La. 70118

[21] Appl. No.: 762,275

[22] Filed: Aug. 5, 1985

Related U.S. Application Data

[63] Continuation-in-part of Ser. No. 694,074, Jan. 18, 1985, abandoned.

[51] Int. Cl.[4] ............................................. G09B 25/00
[52] U.S. Cl. ...................................... 434/80; 40/594; 428/41; 428/43
[58] Field of Search ............... 434/80, 79, 72; 40/594; 428/40, 41, 43, 46, 79

[56] References Cited

U.S. PATENT DOCUMENTS

| | | | |
|---|---|---|---|
| 2,586,039 | 2/1952 | Heggedal | 40/594 |
| 2,878,586 | 3/1959 | Ohlsson | 434/80 |
| 2,984,020 | 5/1961 | Levitas | 434/80 |
| 3,012,336 | 12/1961 | Brown | 434/80 |
| 4,148,148 | 4/1979 | Riehle | 40/594 |
| 4,245,401 | 1/1981 | Riehle | 434/80 X |
| 4,250,642 | 2/1981 | Riehle | 434/80 X |

*Primary Examiner*—William H. Grieb
*Attorney, Agent, or Firm*—Emrich & Dithmar

[57] ABSTRACT

A space planning system includes a flexible cast-coated paper substrate with a smooth, flexible sheet of static cling vinyl electrostatically adhered to the coated surface thereof, the vinyl sheet being die cut into a plurality of graphic symbol elements in the shapes of plan or axonometric views of items such as wall sections, windows, furniture, appliances, plants and the like to be arranged in a space to be planned. In use, the graphic symbol elements are peeled from the substrate and electrostatically adhered to the work surface of a flexible work sheet to design a space and the arrangement of articles therein. A first type of work sheet if of clear, transparent polyester, reverse printed with a square or axonometric grid, and may be rolled up along with the graphic symbol substrate for storage in a tube. Another type of work sheet is secured to one or both sides of a rigid board.

34 Claims, 18 Drawing Figures

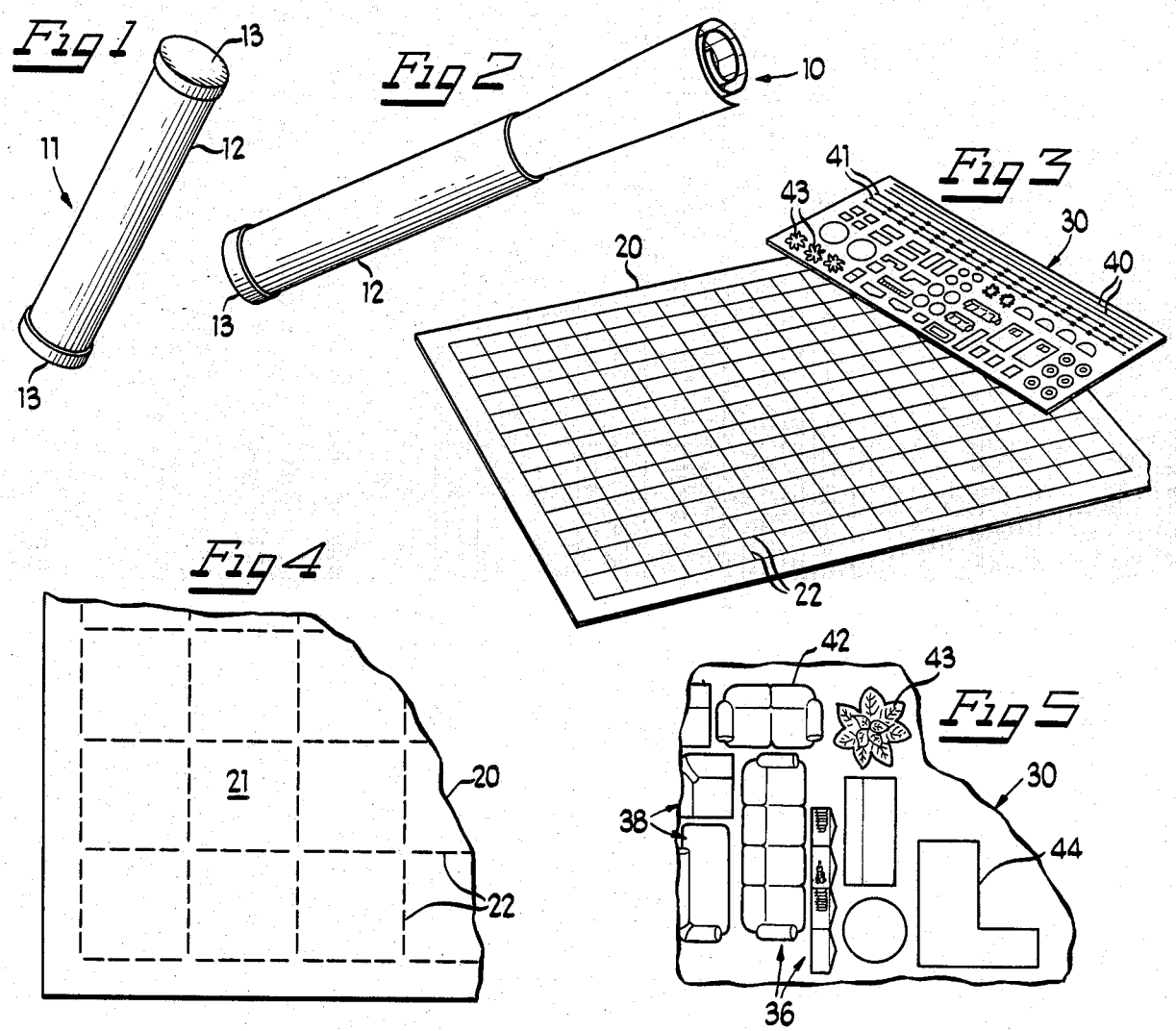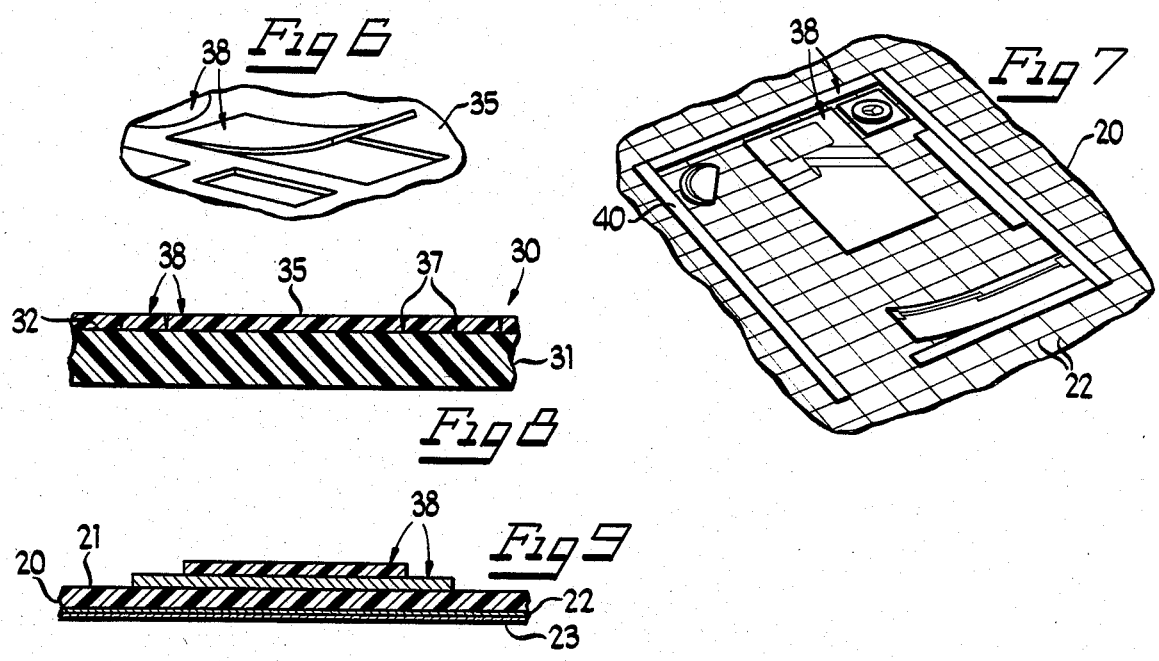

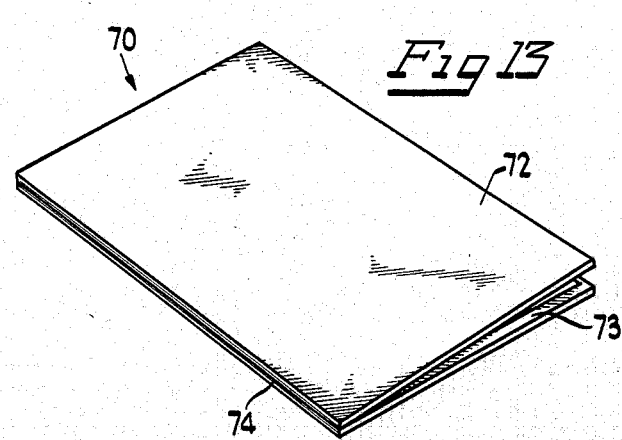
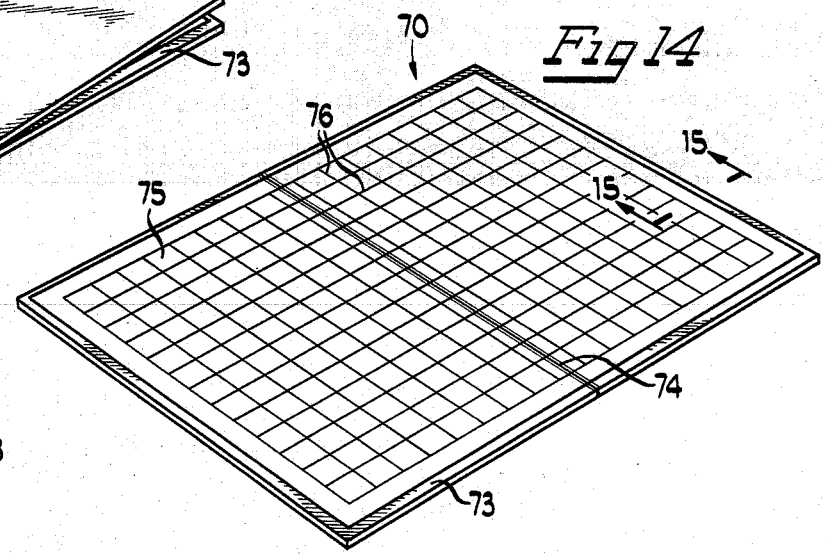
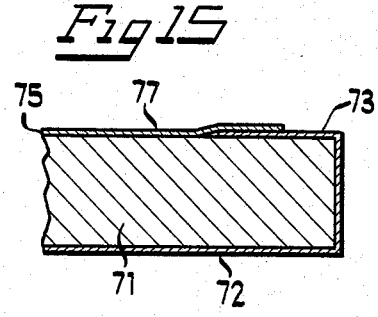
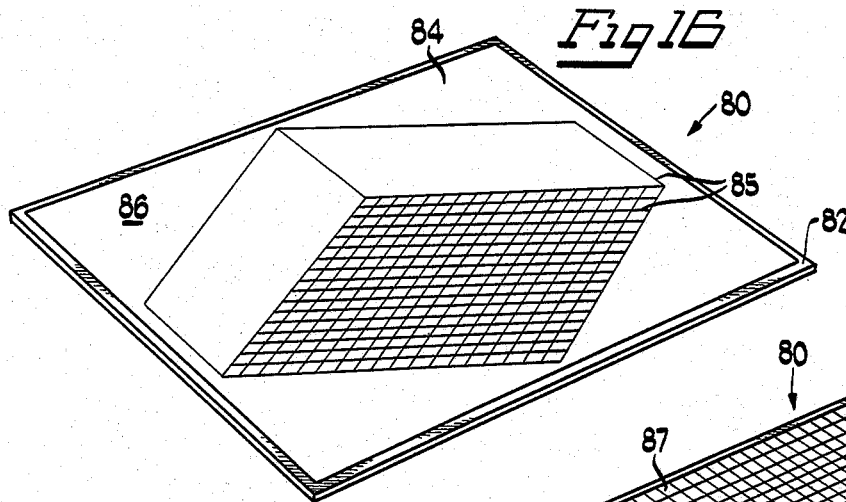
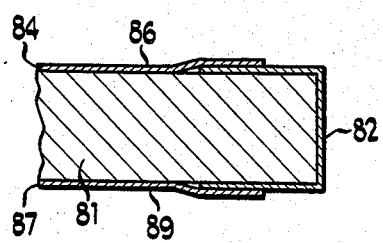
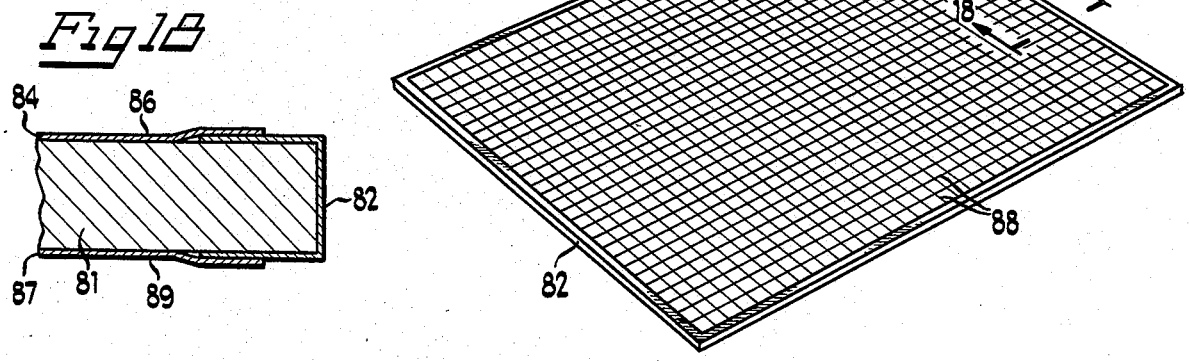

SPACE PLANNING SYSTEM AND METHOD

CROSS REFERENCE TO RELATED APPLICATION

This is a continuation-in-part of my copending U.S. application Ser. No. 694,074, filed Jan. 18, 1985, and entitled "Space Planning System and Method", and now abandoned.

BACKGROUND OF THE INVENTION

The present invention relates to space planning, such as the preparation of floor plans and furniture arrangements in buildings and the landscape planning of yards and the like. The invention has particular application to apparatus and methods for facilitating such planning operations.

Space planning may take several forms. For example, in the case of new construction or the remodeling of existing construction, such planning typically includes the original design of a floor plan layout or the modification of an existing floor plan. Such planning also includes the planning of the placement of furnishings and fixtures in the rooms of a building. Space planning also includes exterior planning such as landscape planning for yards and the like, including the selection and placement of plants and the placement of exterior structures. All such space planning is typically done by drawing the plans on paper, which normally requires the skill of a professional. Preliminary plans are drawn, and these undergo a series of changes and revisions to arrive at a final plan. Each such change or revision in the plan, therefore, entails the preparation of new drawings or the modification of existing drawings, which is an expensive and time-consuming procedure.

Magnetic space planning kits have been developed for the use of professionals. Such kits include a magnetic work surface and a number of magnetic elements in the shapes of furniture, fixtures or any other type of article to be located in the space being designed, these elements being magnetically positioned on the work surface. This greatly facilitates plan modification, since the elements can be easily moved around on the work surface. However, such magnetic kits are heavy, bulky and quite expensive.

Planning kits have also been provided utilizing light and less bulky materials, such kits being disclosed, for example, in U.S. Pats. No. 4,250,642, No. 4,245,401 and No. 4,148,148. But such kits have utilized work sheets of complex composite construction and/or use relatively rigid graphic symbol elements.

SUMMARY OF THE INVENTION

It is a general object of the present invention to provide an improved system and method for space planning which avoids the disadvantages of prior systems and methods, while affording additional structural and operating advantages.

An important object of the invention is the provision of a system which can easily be used by laymen, such as homeowners, as well as professional space planners.

In connection with the foregoing object, it is another object of the invention to provide a space planning system which is of simple and economical construction.

In connection with the foregoing objects, it is still another object of the invention to provide a space planning system which is lightweight, flexible and capable of compact storage.

Yet another object of the invention is the provision of a method of space planning which entails a novel use of existing inexpensive technology.

In connection with the foregoing object, it is yet another object of the invention to provide an improved method of space planning which eliminates the trouble and expense of drafting and redrafting preliminary plans.

Certain of these objects are attained by providing a system for planning the design of an area and the arrangement of items in the area, the system comprising: a unitary, one-piece work sheet having a smooth, non-porous work surface, the work sheet bearing indicia in the form of a grid visible from the work surface; and a flexible symbol storage assembly, the assembly including a relatively thick substrate sheet of flexible material having a smooth non-porous storage surface, and a graphic symbol sheet comprising a thin, smooth, flexible sheet of static cling vinyl material adhered only electrostatically to the storage surface, the graphic symbol sheet having a plurality of graphic symbol elements die cut therein so as to be separable therefrom, the elements being respectively in the shapes of views of portions of the boundaries of the area and items to be located therein; whereby the elements may be selectively peeled from the electrostatically adhered to the storage surface of the substrate and the work surface of the work sheet for defining the area and arranging the placement of the items therein.

Others of these objects are attained by providing a method for planning the design of an area and the arrangement of items in the area, the method comprising the steps of: providing a work sheet having a smooth non-porous work surface and bearing indicia in the form of a grid visible from the work surface, providing a smooth non-porous storage surface and a plurality of graphic symbol elements each formed of a thin, smooth, sheet of static cling vinyl material electrostatically adhered to the storage surface, the elements being respectively in the shapes of views of portions of the boundaries of the area and items to be located therein, and selectively peeling the elements from the storage surface and applying them to the grid of the work surface and arranging the elements on the work surface to define the area and position the items therein.

The invention consists of certain novel features and a combination of parts and method steps hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a perspective view of a container for the space planning system of the present invention;

FIG. 2 is a perspective view similar to FIG. 1, illustrating the rolled-up space planning system being removed from the container;

FIG. 3 is a perspective view of the work sheet and symbol storage assembly of the space planning system in accordance with a first embodiment of the present invention, unrolled for use;

FIG. 4 is an enlarged, fragmentary, top plan view of a portion of the work sheet of FIG. 3;

FIG. 5 is an enlarged, fragmentary top plan view of a portion of the symbol storage assembly of FIG. 3;

FIG. 6 is a further enlarged, fragmentary, perspective view of a portion of the symbol storage assembly of FIG. 3, illustrating removal of one of the graphic symbols therefrom;

FIG. 7 is a fragmentary perspective view illustrating application of the graphic symbols to and removal of them from the work sheet of FIG. 4;

FIG. 8 is an enlarged, fragmentary view in vertical section of the symbol storage assembly of FIG. 5;

FIG. 9 is an enlarged, fragmentary view in vertical section of a portion of the system of FIG. 7, illustrating application of the graphic symbol elements to the work sheet and to each other;

FIG. 13 is a perspective view of a foldable work sheet in accordance with another embodiment of the invention, illustrated in its folded condition;

FIG. 14 is a perspective view of the work sheet of FIG. 13, illustrated in its unfolded condition;

FIG. 15 is an enlarged fragmentary view in vertical section taken along the line 15—15 in FIG. 14;

FIG. 16 is a front perspective view of a work sheet in accordance with yet another embodiment of the invention;

FIG. 17 is a rear perspective view of the work sheet of FIG. 16; and

FIG. 18 is an enlarged, fragmentary view in vertical section taken along the line 18—18 in FIG. 17.

DESCRIPTION OF THE PREFERRED EMBODIMENTS

Figure 10:
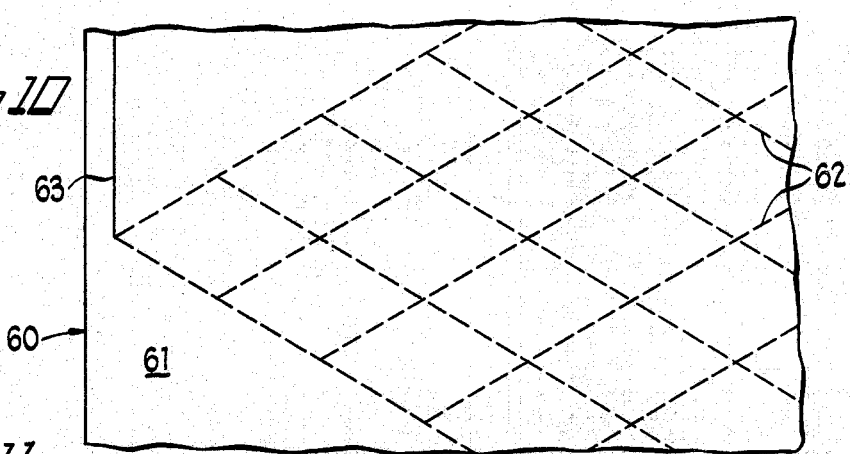
FIG. 10 is an enlarged, fragmentary, top plan view of a portion of a work sheet in accordance with the second embodiment of the present invention.

Referring to FIGS. 1-3, there is illustrated a space planning system, generally designated by the numeral 10, constructed in accordance with and embodying the features of a first embodiment of the present invention. The system may be packaged in a container 11, which includes a cylindrical tube 12 closed at both ends thereof by end caps 13, although it will be appreciated that other types of packaging could be utilized.

Referring also to FIGS. 4, 7 and 9, the system 10 includes a work sheet 20 which comprises a flat, rectangular, flexible sheet of a suitable material having an obverse work surface 21 (see FIG. 4) which is extremely smooth and non-porous. The work sheet 20 is formed of an optically clear, durable material which can be fabricated in thin, flexible sheets. Preferably, the work sheet 20 is formed of a polyester material, such as a polyester film of the type sold by E. I. Du Pont de Nemours & Co., Inc. under the trademark "MYLAR", although it will be appreciated that other materials having the necessary characteristics could be utilized.

The work sheet 20 is provided with indicia 22 in the form of a square grid. Preferably the indicia 22 are imprinted on the reverse surface of the work sheet 20, as by silk-screening. Printing on the reverse surface permits the indicia 22 to be visible from the work surface 21 without impairing the smoothness thereof. The indicia 22 may be imprinted in any desired color, but are preferably imprinted in a relatively light color. The indicia 22 are then overprinted on the reverse surface of the work sheet 20 with an opaque background indicia 23 of a darker or constrasting color, which covers the entire reverse surface of the work sheet 20. This background indicia 23 serves to provide an even, uniform background and prevents the indicia 22 from being confused or obscured by underlying objects or material which otherwise might be visible through the work sheet 20.

Referring also to FIGS. 5, 6 and 8, the system 10 also includes a symbol storage assembly 30, which includes a relatively thick substrate 31 having a very smooth, substantially non-porous storage surface 32. The substrate 31 may be formed of any suitable sheet material, having a thickness such that the substrate 31 has sufficient flexibility that it can be rolled into a tube for storage in the container 11. Preferably, the substrate 31 is formed of a cast-coated paper material, the storage surface 22 being the coated surface of the paper.

Overlying the substrate 31 is a relatively thin sheet 35 of an optically transparent, static cling vinyl material which is dimensioned to cover the entire storage surface 32 of the substrate 31 and is electrostatically adhered thereto. The sheet 35 is preferably formed of a polyvinyl chloride material and is manufactured by a calendering process, as is well known in the art. The obverse surface of the vinyl sheet 35 is imprinted with a number of indicia 36 in the form of items which might be located in the space to be planned with the space planning system 10. The vinyl sheet 35 is then die cut, as at 37, along the outlines of the indicia 36 to form a plurality of discrete graphic symbol elements 38 which can be manually peeled from the storage surface 32, separating from the surrounding vinyl sheet 35 along the die cut lines 37, as indicated in FIG. 6.

The indicia 36 may be printed, as by silkscreening, in various colors, selected so as to show up clearly against the grid indicia 22 and the background indicia 23. Preferably, the symbol storage assembly 30 is formed with the vinyl sheet 35 adhered to the substrate 31, and thereafter the vinyl sheet 35 is imprinted with the indicia 36, the final step being the die cutting operation.

The indicia 36 may take various forms, depending upon the particular application for the system 10. Thus, for example, in the planning of the floor space for residential homes and the like, the indicia 36 may include exterior and interior wall section elements 40, window and door elements 41, elements 42 for various items of household furniture, as well as many other types of items of home furnishings and fixtures (not shown), such as appliances, shelving, doors, sinks and the like. Preferably, a plurality of each of these different types of graphic symbol elements 38 will be formed in the vinyl sheet 35, in sufficient quantity to completely furnish and equip a home of a predetermined size.

It will be appreciated that for other applications of the space planning system 10, the symbol storage assembly 30 may be provided with different types of graphic symbol elements 38. Thus, in the case of yard or landscape planning, for example, the indicia 36 may include plant elements 43 and elements (not shown) for other types of items which might typically be found in a yard, such as trees, fences, hedges, swimming pools or the like. When the system 10 is intended to be used for the planning of office space, the graphic symbol elements 38 may include elements 44 for items of office furniture such as a secretarial desk, or other office furniture or equipment (not shown), such as modular secretarial stations, computer and word processing equipment, copying machines, file cabinets and the like. It will, of course, be appreciated that the principles of the present invention could be utilized for planning other types of spaces.

The use of the space planning system 10 will be explained in connection with the planning of a floor space of a home, by way of example, but it will be understood that similar techniques would be applied for planning other types of spaces. Initially, the user of the system 10, which may be a professional space planner or a lay person such as a homeowner, would, in the case of an already existing space, first sketch the space on paper. Thus, a rough layout of existing conditions would be drawn with the positions of walls, doorways, windows and other permanent fixtures such as fireplaces, sinks, closets, radiators and the like positioned approximately in their proper locations. Next, the overall sizes of each room and the distance between elements in them would be measured and these measurements applied to the sketch. The positions of electric, phone and cable outlets and switches would be noted and the direction of door swings would be indicated.

When the rough sketch is completed, the outlines of the rooms are transferred to the work sheet 20. More specifically, the work sheet 20 is spread flat with the work surface 21 facing up. In this regard, it is a significant feature of the present invention that the polyester material of the work sheet is flexible and substantially without "memory" so that it can be easily rolled-up for storage and yet can be unfolded and laid flat substantially without any residual curl in the sheet. Graphic symbol elements 40 representative of exterior walls are peeled from the substrate 31 and electrostatically adhered to the work surface 21 along the lines of the grid indicia 22 in the desired positions. If the exterior wall graphic symbol elements 40 are not of the proper length they may be trimmed with a scissors to the desired length. Preferably, the graphic symbol elements 40 representing walls may be provided in both solid and dashed versions, with the solid walls representing existing structures and the dashed walls being used to indicate new walls to be built, in the case of remodeling or reconstruction.

Next, the graphic symbol elements 40 for the interior walls and the elements 41 for the doors and windows are peeled from the substrate 31 and adhered in the proper positions on the work surface 21. Door and window graphic symbol elements 41 may be adhered on top of the graphic symbol elements 40 for the walls, as indicated in FIG. 9. Preferably, glossy inks are used for the indicia on the graphic symbol elements 38, so that they will adhere to each other about as well as they do to the work sheet 20. However, if desired, when the final plan is complete, the portions of the graphic symbol elements 38 beneath the door and window elements 41 can be cut out with a scissors so that the door and window elements 41 can be adhered directly to the work surface 21.

Finally, the graphic symbol elements 42 representative of the various furnishings and fixtures of the house are peeled from the substrate 31 and electrostatically adhered to the work sheet 20 in the proper positions. It will be appreciated that all of the graphic symbol elements 38 may easily be peeled from the work surface 21 and moved about thereon, as desired, for effecting simple modification or revision of the preliminary plan.

When the plan is complete, it can be photocopied on a copying machine, photographed, or a sheet of drafting or tracing paper can be placed over it and the individual graphic symbol elements 38 traced directly onto the paper. When the user is finished with the system 10, the graphic symbol elements 38 which have been used may be stored in a plastic bag or may be returned to their original positions on the substrate 31. The symbol storage assembly 30 and the work sheet 20 are then rolled-up and reinserted in the tube 12 for storage. In this regard, the work surface 21 is preferably not placed against the symbol storage elements 38, so that they will not be inadvertently peeled off the substrate 31 and adhered to the work surface 21. To prevent this a sheet of porous, non-stick paper may be placed between the work sheet 20 and the symbol storage assembly 30 before rolling them up.

Figure 11:
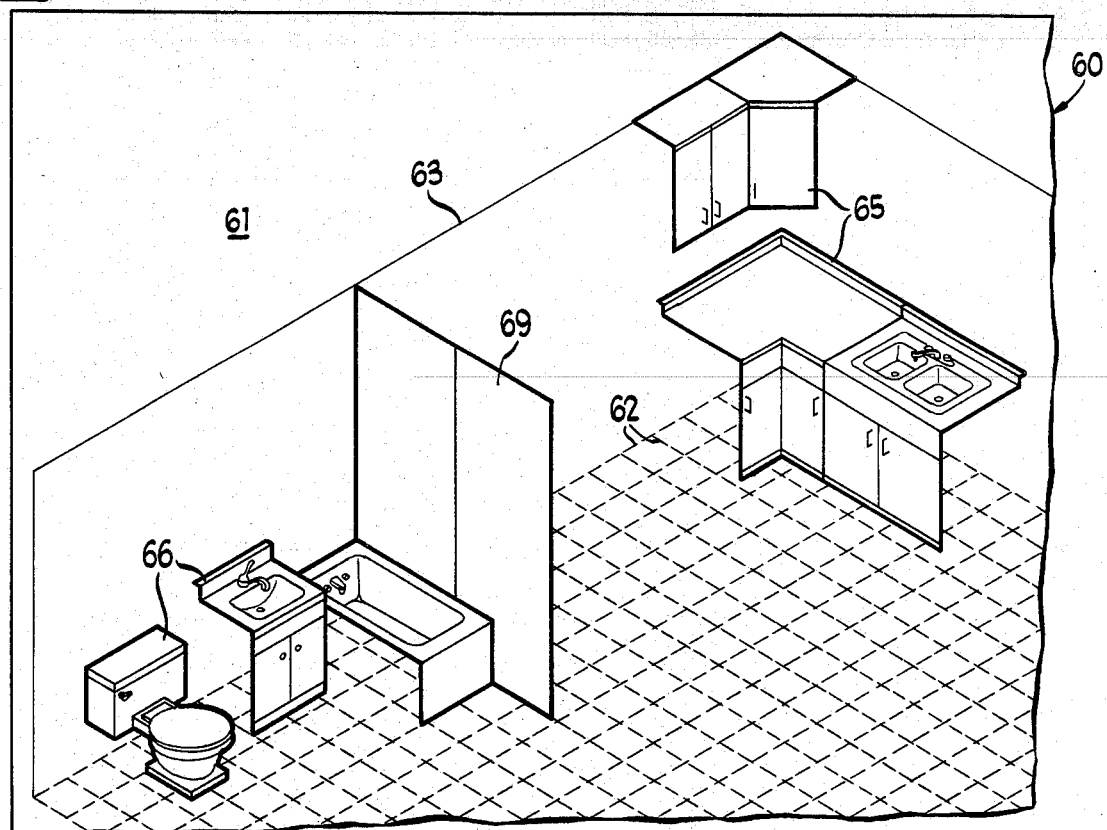
FIG. 11 is a reduced, fragmentary, top plan view of the work sheet of FIG. 10 with graphic symbol elements applied thereto.
Figure 12:
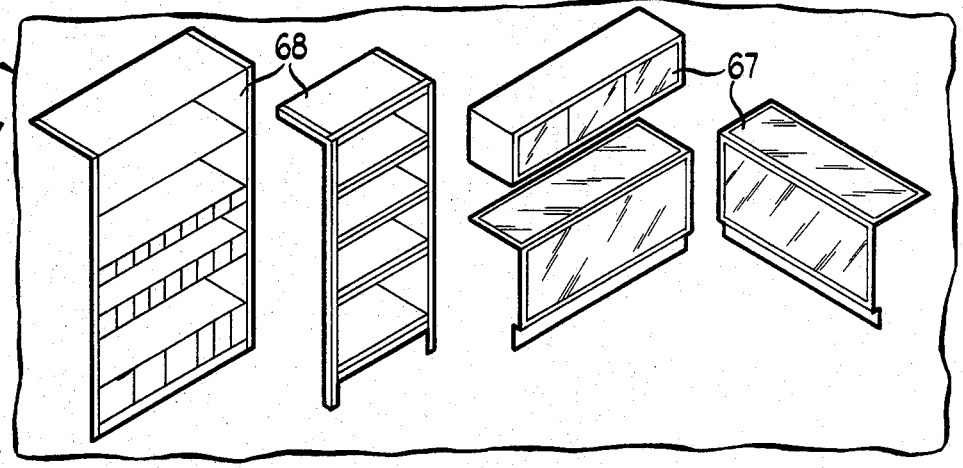
FIG. 12 is a fragmentary, top plan view of a portion of a symbol storage assembly in accordance with another embodiment of the present invention.

Referring now to FIGS. 10-12, there is illustrated a space planning system 50, constructed in accordance with another embodiment of the present invention. The system 50 includes a work sheet 60 having an obverse work surface 61l. The construction of the work sheet 60 is the same as that of the work sheet 20, described above, except for the indicia thereon. More particularly, the work sheet 60 has grid indicia 62 thereon which form an axonometric projection of the square grid of the work sheet 20, the work sheet 60 also including indicia 63 which define the wall outlines of a corner of the floor space indicated by the grid indicia 62.

The system 50 also includes a symbol storage assembly 64, the construction of which is the same as that for the symbol storage assembly 30, described above, except for the indicia on the graphic symbol elements thereof. More particularly, the graphic symbol elements of the symbol storage assembly 54 are in the shape of axonometric views of various items of furniture, fixtures or the like which are to be arranged on the grid of the work surface 61. Thus, by way of illustration, the symbol storage assembly 64 may include graphic symbol elements 65 in the shape of kitchen fixtures and appliances, elements 66 in the shape of bathroom fixtures and appliances (FIG. 11), elements 67 in the shape of retail showroom furniture and appliances, elements 68 in the shape of warehouse racking and storage systems and fixtures (FIG. 12) and elements 69 in the shape of wall or partition sections (FIG. 11). The system 50 is used in the same manner as the system 10, it being appreciated that the axonometric graphic symbol elements 65-69 are designed to cooperate with the axonometric grid indicia 62 and 63 to simulate a three-dimensional view of a space plan, as is best indicated in FIG. 11.

Referring to FIGS. 13-15, there is illustrated a work board 70 in accordance with another embodiment of the present invention. The work board 70 includes a relatively rigid substrate 71, which may be formed of cardboard or the like, covered on the rear surface thereof by a backing sheet 72 of decorative and protective material, which is wrapped around the peripheral edges of the substrate 71 to form a narrow margin or border 73 along the periphery of the front surface thereof. The work board 70 may be foldable along a fold line 74, in which case the substrate 71 may comprise two separate panels or may be formed of a single panel creased to form a hinge portion along the fold line 74, in a known manner. Alternatively, the work board 70 may comprise a single, non-foldable substrate 71.

Secured to the front surface of the substrate 71, as by a suitable adhesive, is a rectangular work sheet 75 which is imprinted with grid indicia 76 thereon. Preferably, the peripheral edges of the work sheet 75 overlap the margin 73 of the backing sheet 72, as indicated in FIG. 15. The work sheet 75 has an obverse work surface 77 which is smooth and non-porous, the work sheet 75 being formed of any suitable material, such as a suitable plastic, a coated paper or the like, the work surface 77 being such that the graphic symbol elements 38 may be electrostatically adhered thereto, whereby the work board 70 is used in the same manner as the work sheet 20 described above.

Referring now to FIGS. 16-18, there is illustrated a work board 80 in accordance with another embodiment of the present invention. The work board 80 includes a relatively rigid substrate 81, which may be formed of cardboard or the like, the peripheral edges thereof being covered with a marginal cover sheet 82 which overlaps the front and rear surfaces of the substrate 81 a slight distance to define marginal flanges, as indicated in FIG. 18. The marginal cover 82 serves a decorative and protective function and may be formed of any suitable flexible material and be adhesively secured in place. A front work sheet 84 is secured, as by a suitable adhesive, to the front surface of the substrate 81, the peripheral edges of the work sheet 84 overlapping the marginal cover sheet 82, as indicated in FIG. 18. The front work sheet 84 bears grid indicia 85, which may be axonometric grid indicia similar to those described above in connection with FIGS. 10 and 11. The front work sheet 84 has a smooth, non-porous work surface 86 adapted so that graphic symbol elements, such as the elements 65-69 described above, may electrostatically be adhered thereto to simulate a three-way dimensional view of the space plan.

Fixedly secured, as by a suitable adhesive, to the rear surface of the substrate 81 is a rear work sheet 87, which also overlaps the marginal cover sheet 82, as indicated in FIG. 18. The rear work sheet 87 has grid indicia 88 thereon which are different from the grid indicia 85 and may, for example, be in the form of a square grid. The rear work sheet 87 is also provided with a smooth, non-porous work surface 89, adapted so that graphic symbol elements 38 may be electrostatically adhered thereto.

Thus, it will be appreciated that, in use, the grid board 80 operates in the same manner as was described above in connection with the work sheets 20 and 75, but there is now provided a single work board which incorporates two completely different grid arrangements. The work sheets 84 and 87 may be formed of the same type of material as the work sheet 75, described above in connection with FIGS. 13-15. While, for purposes of illustration, the work board 80 has been illustrated as comprising a single, non-foldable board, it will be appreciated that it could also be foldable in the same manner as the work board 70 of FIGS. 13-15.

While, for purposes of illustration, the graphic symbol elements 40-44 have been shown as plan view elements for use with the square grid of the work sheets 20, 75 or 87, it will be appreciated that those symbol elements could also be provided in axonometric projection views for use with the axonometric grid of the work sheets 60 or 84. Similarly, while, for purposes of illustration, the graphic symbol elements 65-69 have been shown as axonometric views for use with the axonometric grid of the work sheets 60 or 84, it will be appreciated that they could also be provided in plan view for use iwth the square grid of the work sheets 20, 75 or 87.

The grid indicia 22, 62 76, 85 and 88 are preferably laid out on a scale which may be in a range from about one-sixteenth inch to the foot to about one inch to the foot, depending on the application. Thus, for example, a scale of one-eighth inch to the foot could be used for kitchen and bath planning applications, a scale of one-quarter inch to the foot could be used for general home planning applications, and a scale of one-half inch to the foot could be used for office planning applications.

It will be appreciated that there have been provided a novel space planning system and method which effectively eliminate multiple redrawings of space plans, and rather permit simple changes, variations and rearrangements of a preliminary plan without redrafting. The system and method of the present invention are particularly advantageous and are very inexpensive and easy to use, so that they can be used by lay persons as well as professionals.

I claim:

1. A system for planning the design of an area and the arrangement of items in the area, said system comprising: a unitary, one-piece work sheet having a smooth, non-porous work surface, said work sheet bearing indicia in the form of a grid visible from said work surface; and a flexible symbol storage assembly, said assembly including a relatively thick substrate sheet of flexible material having a smooth non-porous storage surface, and a graphic symbol sheet comprising a thin, smooth, flexible sheet of static cling vinyl material adhered only electrostatically to said storage surface, said graphic symbol sheet having a plurality of graphic symbol elements formed thereon so as to be separable from one another and from said storage surface while leaving said storage surface intact and continuous, said elements being respectively in the shapes of views of portions of the boundaries of the area and items to be located therein; whereby said elements may be selectively peeled from the electrostatically adhered to said storage surface of said substrate and said work surface of said work sheet for defining the area and arranging the placement of the items therein.

2. The system of claim 1, and further including a relatively rigid substrate to one side of which said work sheet is attached.

3. The system of claim 2, wherein said substrate is foldable.

4. The system of claim 2, and further including a second work sheet attached to the opposite side of said rigid substrate.

5. The system of claim 1, wherein said indicia are silk-screened on said reverse surface.

6. The system of claim 5, wherein said indicia include grid lines imprinted in a first color and a background printed over said grid lines in a second color contrasting with said first color.

7. The system of claim 1, wherein said substrate comprises a cast-coated paper.

8. The system of claim 1, wherein said vinyl sheet comprises a calendered sheet of polyvinyl chloride.

9. The system of claim 1, wherein each of said graphic symbol elements has indicia printed thereon.

10. The system of claim 1, wherein said graphic symbol elements include elements in the shapes of windows, doors, fixtures and furniture.

11. The system of claim 10, wherein said graphic symbol elements include elements in the shapes of office furniture and equipment.

12. The system of claim 10, wherein said graphic symbol elements include elements in the shapes of home furniture and appliances.

13. The system of claim 12, wherein said graphic symbol elements include elements in the shapes of kitchen and bathroom fixtures and appliances.

14. The system of claim 1, wherein said graphic symbol elements include elements in the shapes of plants and other landscape items.

15. The system of claim 1, wherein said graphic symbol elements include elements in the shapes of warehouse racking and storage systems and fixtures.

16. The system of claim 1, wherein said graphic symbol elements include elements in the shapes of retail showroom furniture and appliances.

17. The system of claim 1, wherein said grid is arranged on a scale in a range from about one-sixteenth inch to the foot to about one inch to the foot.

18. The system of claim 1, wherein said grid indicia are in the form of square grid and said graphic symbol elements represent plan views of their respective items.

19. The system of claim 1, wherein said grid indicia are in the form of an axonometric projection of a square grid and said graphic symbol elements represent axonometric views of their corresponding items.

20. The system of claim 1 wherein said work sheet is flexible, and further including a storage tube for accommodating said work sheet and said flexible symbol storage assembly in a rolled-up condition.

21. A method for planning the design of an area and the arrangement of items in the area, said method comprising the steps of: providing a work sheet having a smooth non-porous work surface and bearing indicia in the form of a grid visible from said work surface, providing a smooth non-porous storage surface and a plurality of graphic symbol elements each formed of a thin, smooth sheet of static cling vinyl material electrostatically adhered to said storage surface, said elements being respectively in the shapes of views of portions of the boundaries of the area and items to be located therein, and selectively peeling the elements from the storage surface without disturbing the storage surface and applying them to the grid of the work surface and arranging the elements on the work surface to define the area and position the items therein.

22. The method of claim 21, wherein said grid is arranged on a scale in a range from about one-sixteenth inch to the foot to about one inch to the foot.

23. The method of claim 21, wherein said work sheet and said graphic symbol elements are flexible, said storage surface being formed on a flexible storage sheet.

24. The method of claim 23, and further including the step of rolling said work sheet and said storage sheet for storage when not in use.

25. The method of claim 24, wherein said graphic symbol elements are adhered to the grid of the work surface when said work sheet is rolled for storage.

26. The method of claim 21, wherein said graphic symbol elements include elements in the shapes of windows, doors, fixtures and furniture.

27. The method of claim 26, wherein said graphic symbol elements include elements in the shapes of office furniture and equipment.

28. The method of claim 27, wherein said graphic symbol elements include elements in the shapes of home furniture and appliances.

29. The method of claim 28, wherein said graphic symbol elements include elements in the shapes of kitchen and bathroom fixtures and appliances.

30. The method of claim 21, wherein said graphic symbol elements include elements in the shapes of plants and other landscape items.

31. The method of claim 21, wherein said graphic symbol elements include elements in the shapes of warehouse racking and storage systems and fixtures.

32. The method of claim 21, wherein said graphic symbol elements include elements in the shapes of retail showroom furniture and appliances.

33. The method of claim 21, wherein said grid indicia are in the form of a square grid and said graphic symbol elements represent plan views of their respective items.

34. The method of claim 21, wherein said grid indicia are in the form of an axonometric projection of a square grid and said graphic symbol elements represent axonometric views of their corresponding items.

* * * * *

UNITED STATES PATENT AND TRADEMARK OFFICE
CERTIFICATE OF CORRECTION

PATENT NO. : 4,652,239
DATED : March 24, 1987
INVENTOR(S) : Barnett J. Brimberg

It is certified that error appears in the above-identified patent and that said Letters Patent is hereby corrected as shown below:

Column 8, Line 45, delete "the", insert --and--.

Signed and Sealed this

Sixth Day of October, 1987

Attest:

DONALD J. QUIGG

Attesting Officer

Commissioner of Patents and Trademarks